United States Patent
Wai et al.

(10) Patent No.: US 11,718,539 B2
(45) Date of Patent: Aug. 8, 2023

(54) EXTRACTION AND RECOVERY OF PD FROM AQUEOUS SOLUTIONS

(71) Applicant: LCW Supercritical Technologies Corporation, Seattle, WA (US)

(72) Inventors: Chien M. Wai, Moscow, ID (US); Horng-Bin Pan, Moscow, ID (US)

( * ) Notice: Subject to any disclaimer, the term of this patent is extended or adjusted under 35 U.S.C. 154(b) by 739 days.

(21) Appl. No.: 16/688,858

(22) Filed: Nov. 19, 2019

(65) Prior Publication Data

US 2021/0147250 A1    May 20, 2021

(51) Int. Cl.
*C01G 55/00* (2006.01)

(52) U.S. Cl.
CPC ................... *C01G 55/001* (2013.01)

(58) Field of Classification Search
CPC .................................... C01G 55/001
USPC ............................................. 423/22
See application file for complete search history.

(56) References Cited

U.S. PATENT DOCUMENTS 10,570,027 B2 * 2/2020 Wai .......... C02F 1/285
11,247,917 B2 * 2/2022 Wai ........... B01J 20/28023

FOREIGN PATENT DOCUMENTS

| CN | 102587117 A | * | 7/2012 | |
|---|---|---|---|---|
| CN | 102587117 B | * | 7/2014 | |
| CN | 108449371 A | * | 8/2018 | ......... H04L 67/2842 |
| JP | 52059799 A | * | 5/1977 | |

* cited by examiner

*Primary Examiner* — Melissa S Swain
(74) *Attorney, Agent, or Firm* — Jacques M. Dulin, Esq.

(57) ABSTRACT

Extraction of platinum-group elements, e.g. Pd, by adsorption from acidic aqueous solutions, using chelating acrylic fibers having amidoxime substituents followed by recovery by elution with an HCl-thiourea solution. From about 10% to 100% of the acrylic fiber CN are converted to amidoxime by reaction with $NH_2OH$ (hydroxylamine) in $H_2O$/MeOH solution in the range of 30° C.-90° C. for from 15 min to 72 hrs. The adsorptive loading of elements onto the fiber and the efficiency of elution therefrom is substantially 100%, in multiple cycles of adsorption/elution. The novel fiber/extraction process is rapid, lending it to a continuous recovery operation. A portion of the CN groups of may be converted to carboxylate groups by reaction with NaOH. Short lengths of fiber are loaded into a vertical column and the pregnant solution introduced. Upon breakthrough, the fibers may be eluted, washed and recycled hundreds of times without removal from the column.

17 Claims, 3 Drawing Sheets

EXTRACTION AND RECOVERY OF PD FROM AQUEOUS SOLUTIONS

FIELD

This application relates to the extraction by adsorption of palladium (Pd) from aqueous solutions, and more particularly to the use of polymer fibers having amidoxime substituents, and optionally carboxyl and amidoxime substituents, to adsorb Pd from acidic aqueous solutions followed by recovery of the Pd by elution with an HCl-Thiourea solution. The preferred fiber is an acrylic fiber or a polyacrylonitrile fiber, at least a portion of the CN groups of which have been converted to amidoxime groups. The adsorption is fast and elution recovery is highly efficient.

BACKGROUND

Fibers have been used to adsorb metal ions from near-neutral pH solutions, particularly polymer fibers such as polyethylene and acrylic fibers that include carboxylate, amidoxime and ester groups substituted thereon. For example, U.S. Pat. No. 10,391,472 (Aug. 27, 2019) uses a polyolefin fiber, the surface of which has covalently appended on its surface both halogen atoms and vinyl-addition polymeric grafts functionalized with carboxylate, hydroxyl, keto, aldo, amino, imino, nitrile, amido, oxime amidoxime, imide dioxime, and hydroxamate groups to adsorb U from U-spiked seawater. US Patent Application publication US2-17/0355621 (Dec. 14, 2019) discloses use of an acrylic polymer having single (non-polymeric) carboxy, amidoxime and ester substituents to adsorb U from seawater followed by stripping with $KHCO_3$ or weak HCl.

However, adsorption of metal ions by these types of fibers from acid solutions is not effective. Without being bound by theory, it is believed that amidoxime substituents become protonated in acidic solutions repelling the positively charged metal ions, as a result of which no effective adsorption takes place. Accordingly, adsorption by these types of fibers is done in near-neutral water solutions, e.g. seawater, and the adsorbed metal ions are effectively extractively recovered by elution using dilute HCl. For example, $Cu^{2+}$ ions in near-neutral pH water solutions are effectively extracted by amidoxime (and other substituents or polymeric grafts)-containing fibers, and the adsorbed Cu ions can be eluted from the fiber using a dilute HCl solution, such as 0.1M HCl. However, Cu ions are not adsorbed from acid solutions by these types of fibers, as $Cu^{2+}$ has a very small or non-existent $K_4$, formation constant of metal chloride complexes.

There is a special problem with recovery of Pd from industrial wastes. For example, Pd is widely used as a catalyst for many industrial-scale chemical processes, including electroless plating of copper on PCB (printed circuit board). Effective recovery of palladium from waste waters containing low levels (on the order of 5-10 ppm or less) of palladium is generally difficult to accomplish. Utilizing solid sorbents to remove low levels of palladium from water requires a large distribution coefficient ($K_d$), e.g., sorbent concentration factor.

In Cu plating processes, Pd is used as an adjunct to the acidic plating solution to improve the rate and coverage integrity of the copper. The plating solution typically contains 25 ppm or more of Pd. The rinse water contains on the order of 2 ppm or less of Pd, yet is not recovered because of technical difficulties and economic considerations. Thus, the rinse water is routinely thrown away even though it is a pollutant. Pd is the most expensive of the noble metals, currently in excess of $1600-$1700/oz, i.e., around $5×10^4$ per kilogram, and thus its disposal without recovery from the plating process is a major processing cost. Pd is likewise used in electroless Ni plating processes.

Pd is also present in spent nuclear reactor fuel, but none of the existing nuclear reprocessing facilities are equipped to extract Pd from radioactive waste. Pd is also used in automotive catalytic converters, and extraction of Pd from the waste is not routinely done. Pd is a versatile heterogenous catalyst, used in many industrial processes, such as hydrogenation, dehydrogenation and petroleum cracking, carbon-carbon and carbon-flourine bonding reactions in organic chemistry, as an electro-catalyst for oxidation of primary alcohols, and in platinotype printing processes using Pd salts. Its use is growing in synthetic biology, e.g., in vivo catalytic activity to treat disease. However, toxicity is not well explored and high toxicity is suggested over long time-frames at the cellular level in the kidney and liver.

Recovering palladium from industrial waste waters discharged by plants utilizing palladium catalysts continues to be an important economic issue because of its high value. There is thus a long, unmet need for a rapid, efficient and inexpensive process to adsorptively remove Pd from such type industrial, biologic and municipal waste solutions, and for the recovery of the Pd by simple recovery process that permits reuse of the adsorption media.

THE INVENTION

Unexpectedly, we have discovered that Pd behaves differently than Cu and other transition metals when interacting with chelating amidoxime-containing fibers. Unlike Cu ions, Pd ions in aqueous acidic (HCl) solutions can be efficiently adsorbed by amidoxime-containing fibers. Without being bound by theory, we believe this is due to Pd forming a chloride anion complex, $(PdCl_4)^{2-}$ in the acid solution. At the same time, the amidoxime group has become protonated at low pH, and the resulting amidoxime+ charge attracts the negatively charged $(PdCl_4)^{2-}$ anion complex resulting in highly efficient adsorption on the substituted fiber.

In addition, we have discovered that the protonation of the amidoxime groups at low pH results in the fiber becoming hydrophilic in acid solutions. As a result, conventional hydrophilic functional groups, such as carboxylate groups, are not needed for the fiber to efficiently adsorb metal ions in acid solutions, but optionally may be included. A further consequence is that without carboxylation, a greater number, or percent, of nitrile groups can be converted to amidoxime groups, rather than distributing the substituents between both carboxylate and amidoxime. The increased percentage of amidoxime groups in the substituted fiber results in higher loading of adsorbed Pd and thus greater elution yield. The number or percent of nitrile groups, which contribute to fiber strength can be controlled to provide any desired amount of fiber robustness for use. Still another consequence is that the inventive adsorption fiber used in the process of this application is less expensive to manufacture, as a carboxylation step is omitted.

The inventive amidoxime-containing fiber used in the process of this application is prepared from acrylic fiber, such as Orlon yarn, by converting part of the pendant nitrile groups, —C≡N, of the Orlon to direct, monomeric (as distinct from pendant polymeric) amidoxime groups:

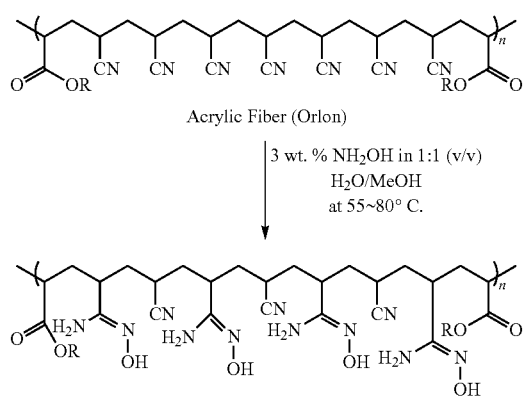

Acrylic Fiber (Orlon)

3 wt. % NH$_2$OH in 1:1 (v/v) H$_2$O/MeOH at 55~80° C.

wherein n is from 1000 to 100,000, and R is an alkyl, a substituted alkyl, a cycloalkyl, a heterocycloalkyl, an aryl or a heteroalkyl group, and the percent conversion of nitrile groups to amidoxime groups is in the range of from 10% to 100%. The reaction of the acrylic fiber with hydroxylamine is maintained in methanol-water in the temperature range of from about 30° C. to about 90° C. at selected reaction times in the range of from about 15 min to about 72 hrs. The amidoximation reaction can also be carried out in water only, but it is less effective than that in a methanol-water mixture. The percentage of remaining nitrile and ester functional groups may be selected to provide a desired level of mechanical properties of the resulting chelating adsorbent fiber.

The resulting prepared amidoxime groups-containing chelating fiber is then immersed in and exposed to Pd-containing aqueous acidic HCl solution, termed a "pregnant solution" for a suitable time period, depleting the Pd in the pregnant solution and converting it to a "barren solution", the fiber being termed the "loaded fiber". Thereafter the Pd is eluted from the loaded fiber using an HCl-thiourea solution, termed a "removal solution". The elution is rapid, being completed in a time period on the order of less than about 20 minutes, resulting in a solution containing the recovered Pd, termed a "recovery solution". After elution, the fiber is cleaned by rinsing with deionized water to remove thiourea, and the resulting cleaned fiber can be reused repeatedly in multiple cycles with substantially no detectable loss of Pd adsorption capacity. The loading capacity of the amidoxime-substituted fiber is greater than 95%, and even after multiple cycles the fiber loading capacity approaches 100%. The recovery solution can be further treated to concentrate Pd therein, or to remove, it from the recovery solution as a slurry, solid precipitate or ionic solution.

An exemplary convenient form for groups of fiber to be exposed to Pd-containing aqueous acidic HCl solution to effect the adsorption is a "mustache", brush or mop form, formed by looping the fibers through a backbone strip of polyethylene and then cutting the loops to provide fiber strings on the order of from about 2 cm to about 10 cm in lengths. The backbone strip provides a retainer that can be immersed into the solution for the adsorption step. In an alternate embodiment fiber can be cut or chopped into short lengths, on the order of the internal diameter of a column, inserted in a column retained between upper and lower mesh or glass wool plugs, and the pregnant solution pumped through the column until break-through occurs. The loaded fiber can remain in the column for the elution and rinsing step or it can be removed from the column and eluted. Thus, any convenient form of the chelating fibers may be used for efficient exposure to a pregnant solution.

BRIEF DESCRIPTION OF THE DRAWINGS

The invention is described in more detail with reference to the drawings, in which.

DETAILED DESCRIPTION OF THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention. Each publication, patent and patent application publication cited in this specification is herein incorporated by reference.

Figure 1:
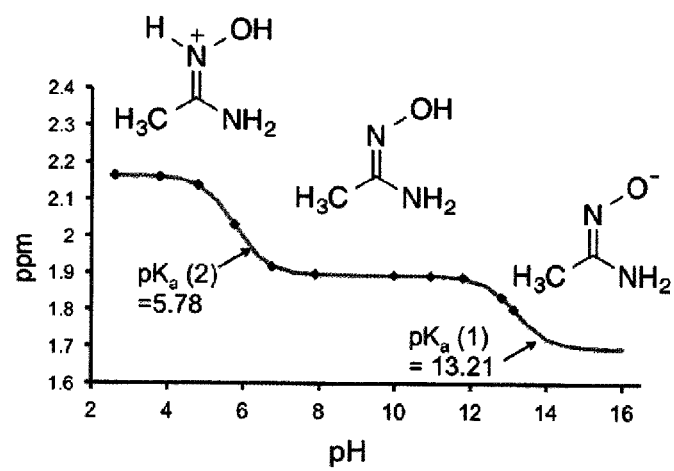
FIG. 1 is a graph showing $^1$H NMR shifts of aqueous acetamidoxime in ppm vs pH at 25° C.

FIG. 1 is a graph of $^1$H NMR shifts of aqueous acetamidoxime in aqueous solutions. The curve goes through a pair of inflection points as the acidity decreases, identified at pK$_a$ points (1) and (2), 13.21 and 5.78, respectively. In the pH zone below (2) the acetamoxidime is protonated by H linked to the hydroxylated nitrogen atom, in the form shown above the graph. In the intermediate pH zone between (2) and (1) the acetamidoxime is neutral, that is, no longer protonated, as shown in the structural formula above the graph. In the pH zone above (1) the acetamidoxime is now a negatively charged ion by loss of the hydroxyl hydrogen. This indicates in acidic solutions the amidoxime will be positively charged and able to hydrogen bond to negatively charged metal ions or complexes. Conversely, in alkaline solutions, the amidoxime, being negatively charged will not bond to negatively charged metal ions or complexes, indeed, being repelled. In the intermediate zone, neutral pH, there is no charge and thus any extraction is by incidental physical entrapment. In reality, above pH 6, Pd forms a precipitate as Pd(OH)$_2$.

EXAMPLES

Example 1, Preparation of Test Fiber, A-Fiber: Nitrile groups of Orlon acrylic fiber are converted to amidoxime groups by treatment of the fiber with 3 wt. % NH$_2$OH (hydroxylamine) in 1:1 (v/v) H$_2$O/MeOH solution in the range of 30° C.-90° C. for from 15 min to 72 hrs. The percent of conversion of the nitrile groups to chelating amidoxime groups can be controlled to vary from about 10% to 100% at those reaction conditions by varying the length of the reaction time, longer reaction periods resulting in a greater percentage of conversion. It is preferred to retain some nitrile and ester functional groups to contribute to robust mechanical properties of the resulting fiber adsorbent. Conversely, the greater the number of amidoxime substituents, the faster Pd adsorption occurs and the greater the loading. Thus, one skilled in this art will be able to select a suitable level of amidoximation to quantify a predetermined adsorption result.

The resulting amidoxime-only substituted fiber, termed "A-Fiber" herein, is used in tests below, as noted, and is particularly effective in all concentrations of Pd in acidic solutions. In addition, prepared as noted in Example 2 next below, a bi-substituted carboxylate-amidoxime-substituted fiber, termed "C-A-Fiber", may optionally be used to adsorb Pd from higher concentration solutions. As a group, the A-Fiber and C-A-Fiber are termed the "Substituted Acrylic Fibers".

Example 2: A First Comparative Fiber, C-A-Fiber is prepared by reacting Orlon acrylic fiber with hydroxyl amine in water/methanol solution, as above, but for a time period sufficient to substitute only approximately 45% of the CN groups with amidoxime. Thereafter the partially-amidoximated fiber is treated with 1 M NaOH at room temperature for from 8-24 hours to convert most of the remaining CN (about 85% of the remaining CN) groups to carboxylate groups. The resulting C-A-Fiber is both carboxylated and amidoximated, with about 10% residual CN and ester groups.

Example 3: Second Comparative, Untreated, Fiber is simply Orlon, having its native complement of CN groups and some ester groups. This is a Second Comparative U-Fiber used in tests described below to show it does not adsorb Pd from acidic solution.

Figure 2:
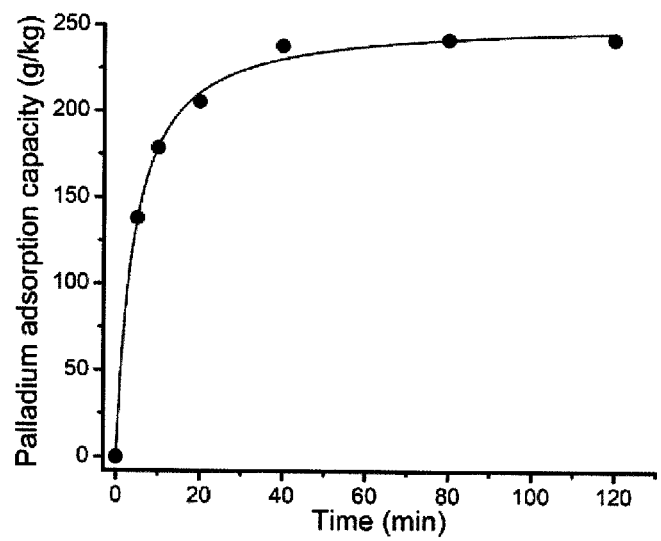
FIG. 2 is a graph showing adsorption rate of $(PdCl_4)^{2-}$ by the inventive amidoxime-containing fiber.

Example 4: A Test Solution comprising Pd dissolved in 0.1 M HCl solution to produce an acidic solution containing 20 ppm Pd. This high Pd concentration is comparable to the spent palladium electroless plating solution. The Test, A-Fiber described above was exposed to the Test Solution at room temperature (22° C.) for the time periods shown graphically in FIG. 2. That FIG. 2 graph shows the rate of adsorption of Pd by the A-Fiber. The adsorption of Pd by the A-Fiber approaches a saturation value after about 40 minutes of contact of the A-Fiber with the Test Solution under gentle stirring (about 100 rpm) by a magnet stirring bar. The loading capacity, expressed as g Pd per kg of fiber (or expressed as mole of Pd per kg fiber), approaches 250 g Pd/kg Fiber. The Pd adsorption capacity further increases to a value of 330 g Pd per kg of fiber at about 60% of conversion of CN to amidoxime, and remains basically constant beyond this level of conversion. The fiber becomes less flexible and more rigid at higher degree of CN to amidoxime conversion. Accordingly a preferred chelating amidoxime A-Fiber of this invention having high Pd adsorption capacity yet good mechanical properties for multiple cycles of use can be produced by carrying out the reaction of the raw acrylic fiber with hydroxyl amine in water/methanol solution at 70° C. for 45 mins, resulting in from about 35% to 65% conversion of the CN to amidoxime groups.

Figure 3:
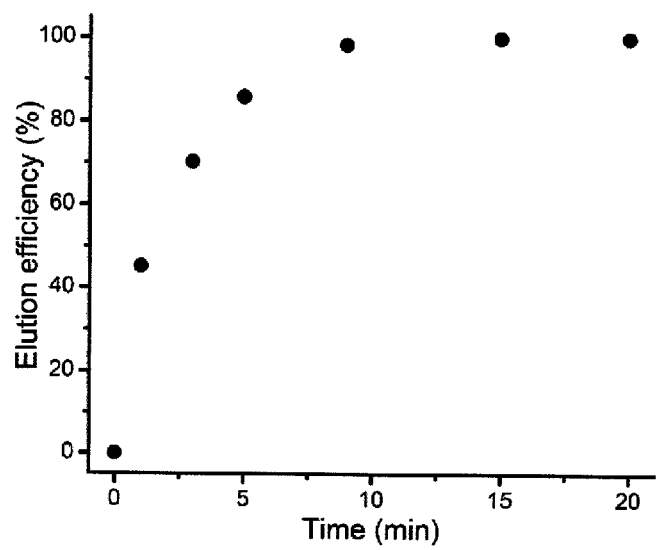
FIG. 3 is a graph showing the rate of Pd elution from the inventive amidoxime-containing fiber using HCl-thiourea solution.

Recovery of Pd after adsorption: After exposure of the A-Fiber to the acidic Pd-containing solution, the adsorbed Pd can be eluted and recovered using 0.3 M HCl with 0.5 M thiourea solution at room temperature. FIG. 3 graphically shows the rate of Pd elution as a percentage elution efficiency vs time. The rate of elution is fast, showing essentially complete recovery in about 10 minutes or less and asymptotically approaching 100% within 15-20 minutes. After elution, the A-Fiber is rinsed with water to remove thiourea, and the resulting clean A-Fiber can be reused in multiple cycles of adsorption/elution recovery.

Figure 4:
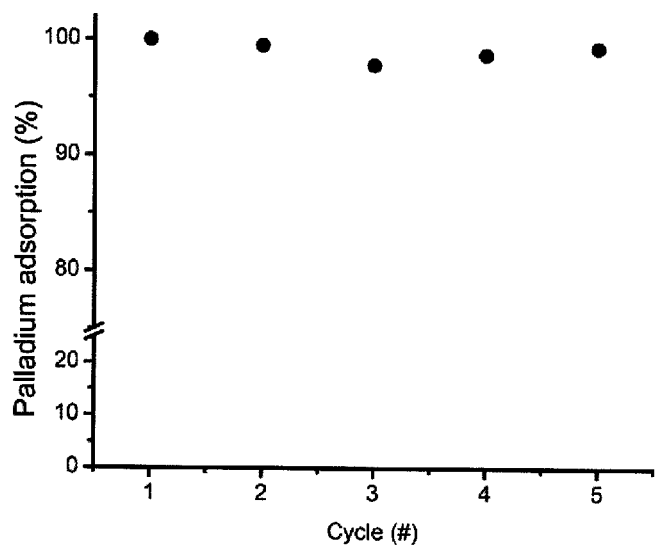
FIG. 4 is a graph showing the Pd loading capacity of the inventive amidoxime-containing fibers after multiple cycles of exposure.

Multi-cycle use: The chelating Test A-Fiber was repeatedly cycled through adsorption and elution steps under the conditions described above. FIG. 4 graphically shows the Pd adsorption achieved, expressed as a loading percentage vs cycle number, in five successive cycles. The results clearly indicate that yield over time is relatively constant, varying only about 2%, i.e., 99±1%. This indicates the amidoxime groups are retained by the fiber, that is, they are not appreciably hydrolyzed-off.

Figure 5:
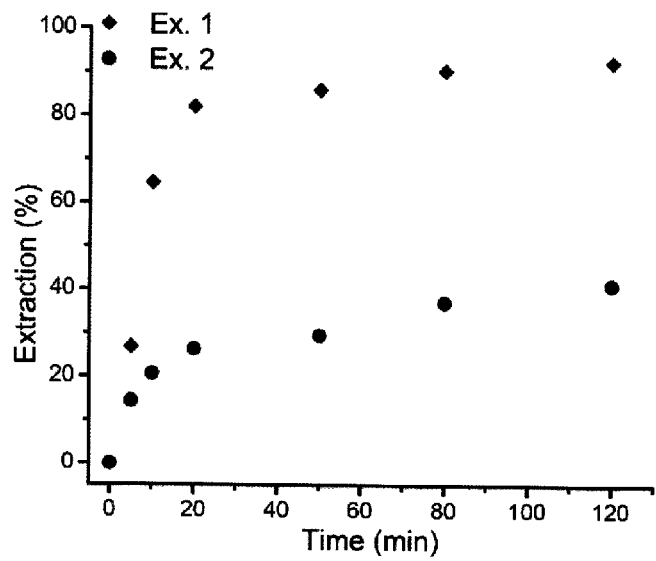
FIG. 5 is a graph showing the extraction capability of palladium from acid solution (500 ppb Pd$^{2+}$ at pH=1) by amidoxime (Ex. 1) and amidoxime-carboxylate (Ex. 2) containing fibers.

Example 5, Direct Comparison at Low Pd Concentration: The Test A-Fiber of this invention described above in Example 1 (amidoximated-only fiber with ½ CN converted to amidoxime) and the First Comparative C-A-Fiber described above in Example 2 (carboxylated and amidoximated fiber) were exposed to a spiked Pd Test Solution having 500 parts per billion (ppb) of Pd in 0.1 M HCl. The results of the adsorption of Pd is shown in FIG. 5. The results of the extraction of Pd is shown in FIG. 5. The extraction efficiency of the A-Fiber, Example 1, is about 95% and for the carboxylate-amidoximated C-A-Fiber, Example 2, is less than half, about 40%, in the same time period, 120 minutes.

Figure 6:
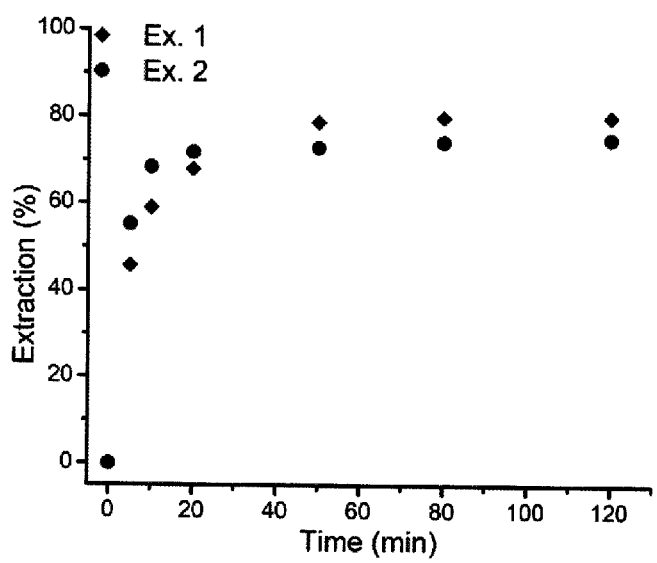
FIG. 6 is a graph showing the extraction capability of palladium from acid solution (20 ppm Pd$^{2+}$ at pH=1) by amidoxime (Ex. 1) and amidoxime-carboxylate (Ex. 2) containing fibers.

Example 6, Direct Comparison at high Pd Concentration: The Test A-Fiber of this invention described above in Example 1 (amidoximated-only fiber with ½ CN converted to amidoxime) and the First Comparative A-C-Fiber described above in Example 2 (carboxylated and amidoximated fiber) were exposed to the Example 4 spiked Pd Test Solution having 20 parts per million (ppm) of Pd in 0.1 M HCl. The results of the extraction of Pd is shown in FIG. 6. The extraction efficiencies of the A-Fiber, Example 1, and for the carboxylate-amidoximated A-C-Fiber, Example 2, are close to the same, yet the amidoximated-only A-Fiber still out-performs the carboxylated-amidoximated C-A-Fiber, 80% to 78% in the same time period, 120 minutes.

Example 7: An Untreated Fiber was exposed to the 20 ppm-spiked Pd Test Solution described above in Example 4. This fiber was essentially unable to adsorb Pd.

Example 8: The Test A-Fiber was chopped into short lengths (1 cm) and filled into a plastic column of about 1.6 cm inner diameter and 15 cm in length with glass wool placed at the top and the bottom ends to retain the fiber material in the column. The amount of fiber was about 2 grams in weight and occupied a vertical height of 5.5 cm in the vertically-oriented column with a total fiber volume of about 10 mL. A pregnant solution containing 1 ppm of Pd solution (in 0.1 M HCl at pH=1) was pumped into the column from the top of the column by a peristaltic pump at a flow rate of 20 mL per minute. After passing through the column, the barren solution was collected in a graduated cylinder at different intervals for residual Pd analysis. No Pd was detected (detection limit 5 ppb) in the exit solution after passing 20 liters of the pregnant 1 ppm Pd solution through the column. Thus, the Pd breakthrough point (where Pd starts to leak through the column) is at least 2,000 times the bed volume of the fiber adsorbent (10 mL). Further, the chelating fiber may remain in the column for the elution and rinsing steps, and thereafter recycled through the adsorption steps. This system set-up provides a practical commercial Pd recovery process.

Discussion: The inventive Test A-Fiber, a chelating amidoxime-only substituted acrylic fiber was unexpectedly able to adsorb Pd with a very high capacity (250-340 g Pd per kg of fiber) in acidic solutions over a wide range of Pd concentrations, and repeated cycles of adsorption/elution/cleaning/adsorption resulted in near-100% recovery of its full capacity. The speed of the adsorption and elution portions of the cycle are sufficiently fast that one skilled in the art will recognize that a continuous Pd recovery process is entirely feasible. In addition, the percentage of residual CN groups can be varied to provide fiber robustness for several hundreds of cycles before replacement is needed.

The First Comparative C-A-Fiber, having both amidoxime and carboxylate functional groups, showed about the same Pd loading capacity as the Test A-Fiber, but only when the Pd concentration is high (20 ppm) in 0.1 M HCl solution. At low Pd concentrations, below about 5 ppm, the loading capacity of C-A-Fiber is lower than the Test-A-fiber. For example, at 500 ppb the Pd loading capacity of the First Comparable C-A-Fiber is lower by a factor of 3 relative to the Test Fiber. While we do not wish to be bound by theory, the reduced performance of the First Comparable C-A-Fiber is likely due to hydrogel formation by the carboxylate functional groups resulting in interference with access by Pd to the amidoxime groups and thus reduced Pd adsorption to the amidoxime groups. The hydrogel formation interference is more prominent at low concentrations of metal ions, and thus results in lower Pd adsorption capacity for the fiber.

Further, considering the chemistry of the protonation in acidic solution, the inventive Substituted Acrylic Fibers described in this application are capable of extracting other platinum-group elements including Au, Pt, Re, Ru, Rh, as they each form chelating negatively charged chloride complexes in hydrochloric acid solutions similar to Pd. Furthermore, selective extraction of Pd from acidic waste waters containing both Pd and Cu can be achieved since Cu is not extracted by the Substituted Acrylic Fibers in acid solutions (e.g. 0.1 M HCl)

INDUSTRIAL APPLICABILITY

It is clear that the inventive fibers and process of this application has wide applicability to the pollution control industry, namely to recovery of heavy metals from industrial waste waters. For example, the inventive Substituted Acrylic Fibers adsorption/elution technology will have important applications in recovering precious metals in industrial waste waters. Thus, in the industrial process of electroless deposition of Cu on printed circuit boards (PCB), palladium in hydrochloric acid solution is used as a catalyst for the Cu deposition process. Washing of PCBs after Cu deposition results in large volumes of waste water containing very low concentrations of Pd (1 ppm or less) and Cu (10 ppm or less). The inventive Substituted Acrylic Fibers and adsorption/elution process described in this application provides an efficient, low cost, and robust system for recovery of Pd from such industrial waste waters. Thus, the inventive Substituted Acrylic Fibers and cyclic adsorption/elution process of this invention has the clear potential of becoming adopted as the new standard in the heavy metals recovery industry.

It should be understood that one of ordinary skill in this art will recognize that various modifications within the scope of this invention can be made without departing from the spirit thereof and without undue experimentation. This invention is therefore to be defined by the scope of the appended claims as broadly as the prior art will permit, and in view of the specification if need be, including a full range of current and future equivalents thereof.

The invention claimed is:

1. A method of removing platinum-group elements from aqueous, acidified hydrochloric acid solutions containing negatively charged chloride complexes of said elements, comprising contacting said solution containing said negatively charged chloride complexes of said elements with a chelating fiber comprising an acrylic polymer having pendant CN groups substituted with amidoxime groups resulting in a structure comprising:

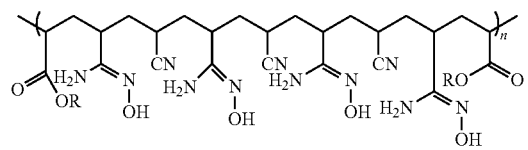

wherein n is from 1000 to 100,000, R is selected from an alkyl, a substituted alkyl, a cycloalkyl, a heterocycloalkyl, an aryl or a heteroalkyl group, the percentage of the amidoxime groups substituted for the CN groups of the original acrylic polymer, as a percent of CN groups in the original acrylic polymer, is in the range of from 10% to 100%, and the percentage nitrile and ester functional groups remaining in said fiber after said substitution with amidoxime is selected to provide suitable mechanical properties of said chelating fiber for repeated cycles of adsorption and elution.

2. A method as in claim 1 wherein said amidoxime groups are present in a range of from 30% to 65% of the CN groups in said acrylic polymer.

3. A method as in claim 2 wherein some of said pendant CN groups are converted to carboxylate groups by reaction with NaOH.

4. A method as in claim 1 wherein said platinum-group element is selected from Au, Pt, Re, Ru, Rh and Pd.

5. A method as in claim 1 wherein said platinum-group element is adsorbed onto said fiber, and said platinum-group element is removed from said fiber.

6. A method as in claim 5 wherein said platinum-group element is removed by elution.

7. A method as in claim 6 wherein said platinum-group element is eluted using an HCl-thiourea solution.

8. A method as in claim 7 wherein after elution of said platinum-group element, said fiber is rinsed to clean said fiber, and thereafter re-exposed to said platinum-group element chloride complex-containing acidified aqueous solution in at least one additional cycle of adsorption/elution.

9. A method as in claim 8 wherein said cycle of adsorption/elution is effected in a continuous process.

10. A method as in claim 5 wherein said platinum-group element is Pd.

11. A method as in claim 4 wherein the loading of said fiber with said platinum-group element after adsorption is on the order of 100% of the amidoxime substituents.

12. A method as in claim 6 wherein the recovery from said fiber of said platinum-group element after elution is on the order of 100%.

13. A method as in claim 8 wherein the recovery from said fiber of said platinum-group element over said cycles is in the range of 99±1%.

14. A method as in claim 11 wherein said platinum-group element is Pd.

15. A method as in claim 12 wherein said platinum-group element is Pd.

16. A method as in claim 7 wherein said chelating fiber is disposed in at least one column, and said acidified hydrochloric acid solutions containing negatively charged chloride complexes of said platinum group elements is pumped through said column until breakthrough, and said fiber is then eluted to recover the adsorbed platinum group elements.

17. A method as in claim 4 wherein said platinum-group element is present in said aqueous, acidified hydrochloric acid solution along with Cu ions, and said fiber preferentially adsorbs said platinum-group element to the exclusion of Cu, thereby differentially removing said platinum-group element in the presence of Cu.

\* \* \* \* \*